United States Patent [19]
Izawa et al.

[11] Patent Number: 6,029,739
[45] Date of Patent: Feb. 29, 2000

[54] VEHICULAR AIR CONDITIONER

[75] Inventors: Tomoki Izawa; Katsunari Shiroyama; Ryosaku Akimoto; Tatsuhide Kawahara; Shinji Banno, all of Aichi-ken; Sadahiko Tanaka, Tokyo; Masato Ono, Tokyo; Shigeharu Ishii, Tokyo, all of Japan

[73] Assignee: Mitsubishi Heavy Industries, Ltd., Tokyo, Japan

[21] Appl. No.: 08/912,673

[22] Filed: Aug. 18, 1997

[30] Foreign Application Priority Data

| Aug. 21, 1996 | [JP] | Japan | 8-237370 |
| Sep. 6, 1996 | [JP] | Japan | 8-255382 |
| Oct. 3, 1996 | [JP] | Japan | 8-281300 |

[51] Int. Cl.$^7$ .................................................. F28B 29/00
[52] U.S. Cl. ............................. 165/42; 165/43; 62/244; 62/290
[58] Field of Search .............................. 165/41, 42, 43, 165/114, 111; 62/244, 290

[56] References Cited

U.S. PATENT DOCUMENTS

| 2,099,165 | 11/1937 | Henderson | 62/290 |
| 3,612,172 | 10/1971 | Dohnt | 62/290 |
| 3,910,061 | 10/1975 | Irwin | 62/290 |
| 4,089,188 | 5/1978 | Van Laeys | 62/290 |
| 4,976,309 | 12/1990 | Averin | 165/42 |
| 5,478,274 | 12/1995 | Danieau | 454/126 |
| 5,735,338 | 4/1998 | Chevroulet | 165/42 |
| 5,755,107 | 5/1998 | Shirota | 62/244 |

FOREIGN PATENT DOCUMENTS

| 4-43117 | 2/1992 | Japan | 165/76 |
| 8104129 | 4/1996 | Japan . | |
| 9150620 | 6/1997 | Japan . | |

*Primary Examiner*—Ira S. Lazarus
*Assistant Examiner*—Terrell McKinnon

[57] ABSTRACT

In a vehicular air conditioner, in which an air flow passage for directing air sucked horizontally through a suction port upward in a casing having a plurality of blowout ports at the upper part and said suction port at the lower part, and an evaporator, air mix damper, heater, and blowout mode switching damper for selectively switching the plural blowout ports are arranged in the air flow passage, the evaporator can be replaced easily and rapidly, and the contamination of the surroundings, caused by the drain which drops from the evaporator when the vehicle is inclined and flows back into the blower case and drops from it by leaking, is prevented. For this purpose, the evaporator is disposed at a portion where the direction of air changes from horizontal to upward in the air flow passage so as to be tilted in such a manner that the suction port side end thereof is high than the opposite side end, and the casing is divided into a plurality of sections, and also one of the divided casings forms the upper half part of the suction port and is configured as an evaporator detachable cover for covering one side of the evaporator so that the evaporator can be pulled out of the casing by removing the cover.

15 Claims, 5 Drawing Sheets

VEHICULAR AIR CONDITIONER

FIELD OF THE INVENTION AND RELATED ART STATEMENT

The present invention relates to a vehicular air conditioner suitable for a passenger car.

Figure 4:
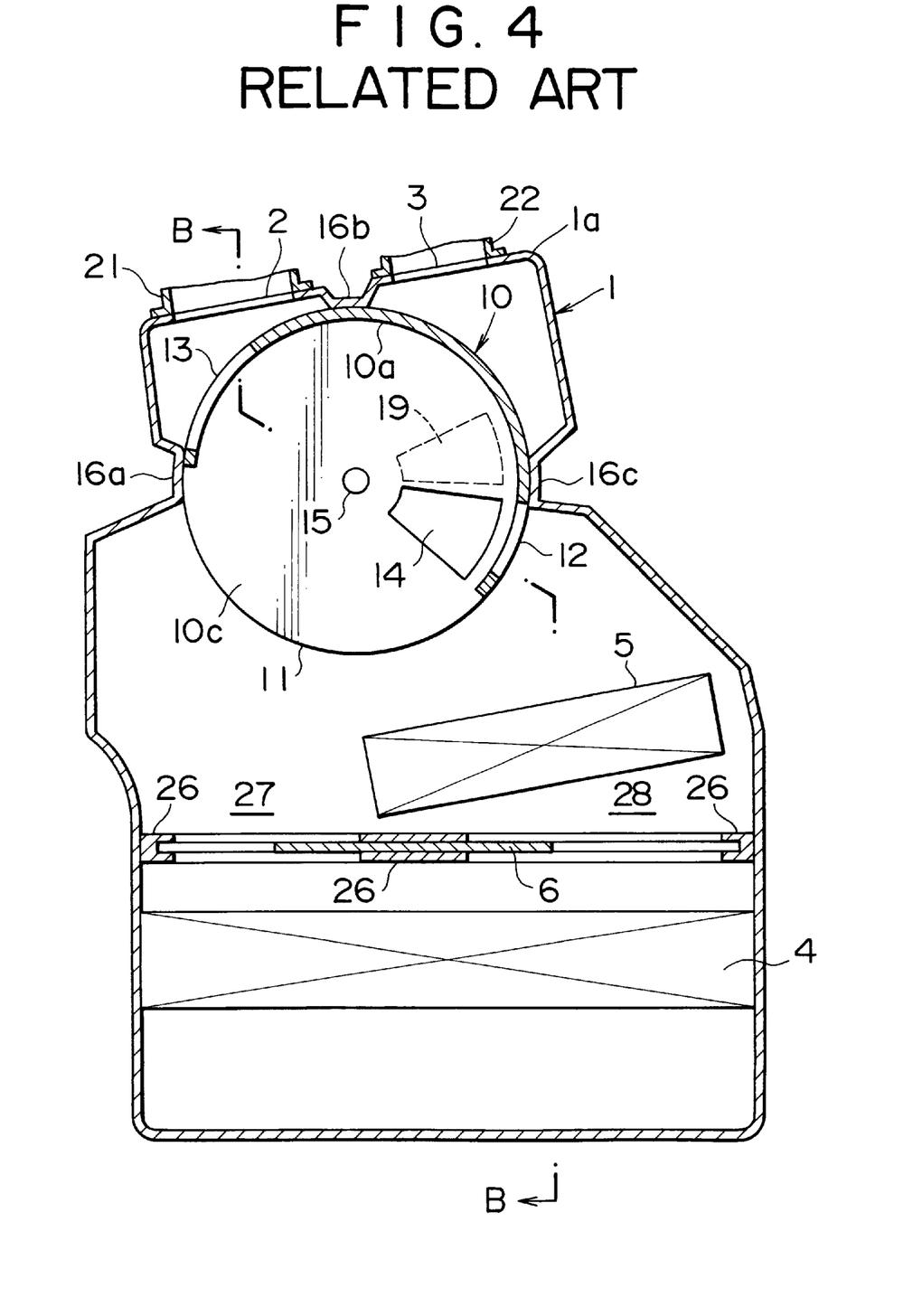
FIG. 4 is a sectional view taken along the line A—A of FIG. 5 showing a conventional air conditioner.
Figure 5:
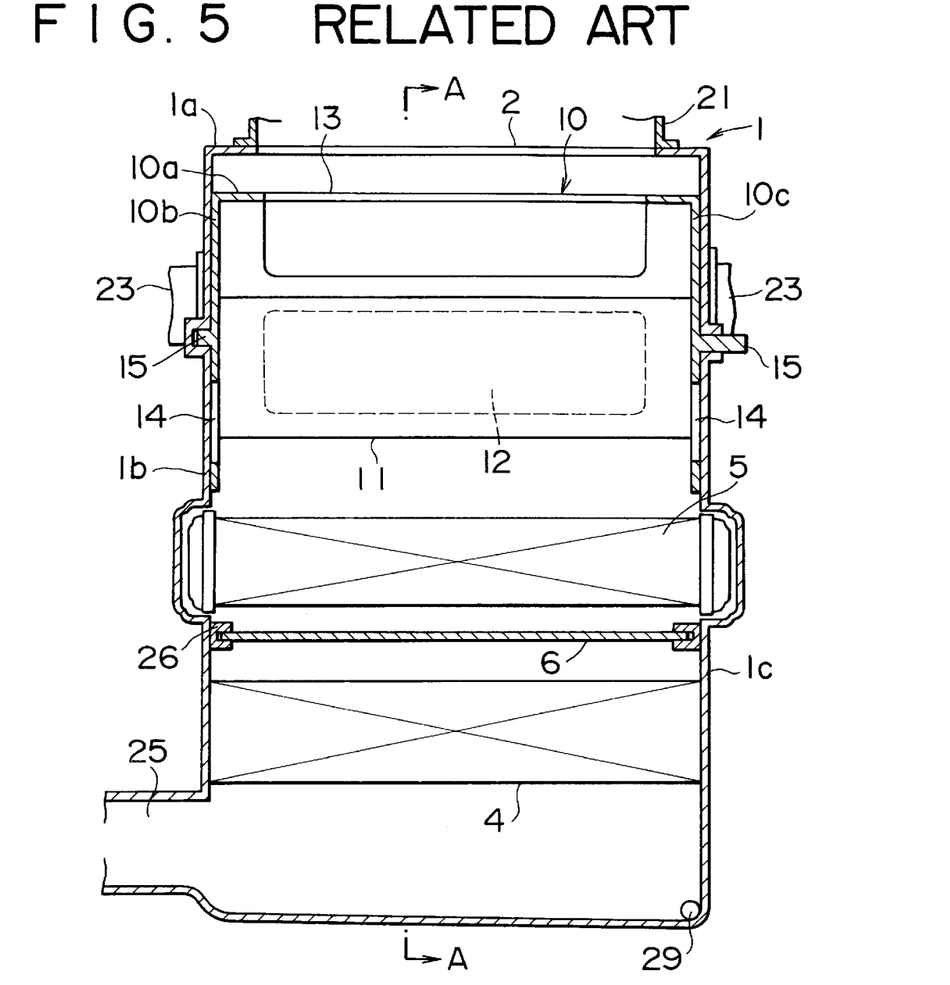
FIG. 5 is a sectional view taken along the line B—B of FIG. 4.
Figure 6:
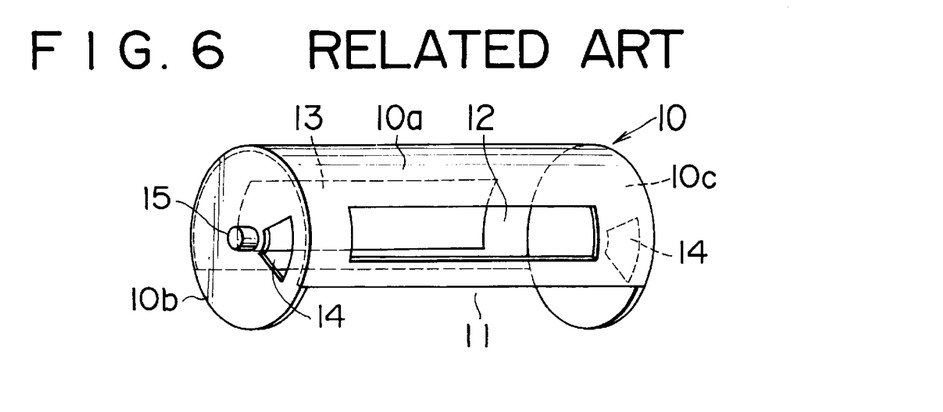
FIG. 6 is a perspective view of a blowout mode switching damper for the conventional air conditioner.

The applicant of the present invention has applied for a patent on a vehicular air conditioner shown in FIGS. 4 to 6 by Japanese Patent Publication No. Hei 9-150620.

FIG. 4 is a sectional view taken along the line A—A of FIG. 5, FIG. 5 is a sectional view taken along the line B—B of FIG. 4, and FIG. 6 is a perspective view of a blowout mode switching damper.

At the upper part of a casing 1 arranged in a center console, a face blowout port 2, defrost blowout port 3, and foot blowout port 19 are formed, and at the lower part thereof, a suction port 25 is formed. In an air flow passage, which is formed in the casing 1 and directs the air sucked horizontally through the suction port 25, an evaporator 4, air mix damper 6, heater 5, and blowout mode switching damper 10 are arranged. The evaporator 4 is installed horizontally at the lower part of the casing 1. The air mix damper 6 is slidably disposed above the evaporator 4 by being guided by guides 26.

The heater 5 is disposed above the air mix damper 6 in such a manner as to be tilted slightly and deviated to one side in the casing 1.

The blowout mode switching damper 10 is disposed in an air mix region above the heater 5 so as to be rotatable around a horizontal axis.

This damper 10 is formed in a hollow drum shape as a whole as shown in FIG. 6, and a cylindrical portion 10a thereof is formed with a defrost outlet 12, face outlet 13, and intake port 11, which is always in communication with an air mix damper region, at predetermined intervals in the circumferential direction. The end plates 10b and 10c each are formed with a fan-shaped foot outlet 14, and a rotating shaft 15 protrudes in the center of the end plate. This rotating shaft 15 is journaled by left and right side walls 1b and 1c of the casing 1.

Protrusions 16a, 16b, and 16c formed on the casing 1 constitutes seal portions by coming close to the outer peripheral surface of the cylindrical portion 10a at predetermined intervals in the circumferential direction.

An upper surface 1a of the casing 1 is formed with the face blowout port 2 positioned between the protrusions 16a and 16b and the defrost blowout port 3 positioned between the protrusions 16b and 16c. The left and right side walls of the casing 1 are formed with the foot blowout port 19 that matches the foot outlet 14.

A face duct 21 is connected in communication with the face blowout port 2, a defrost duct 22 is connected in communication with the defrost blowout port 3, and a foot duct 23 is connected in communication with the foot blowout port 19.

When the air conditioner is operated, the cabin air and/or outside air, which have been energized by a blower incorporated in a blower case (not shown), is sucked horizontally into the lower part of the casing 1 and directed upward by changing its direction, and then flows into the evaporator 4, where the air is cooled by exchanging heat with a refrigerant while passing through the evaporator 4.

This air is split by the air mix damper 6. The air flowing through a heater passage 28, formed on one side of the air mix damper 6, enters the heater 5, where the air is heated by exchanging heat with an engine cooling water. Then, the air is mixed with the air flowing through a bypass passage 27, formed on the other side of the air mix damper 6, in the air mix region, by which a conditioned air of a predetermined temperature is formed.

This conditioned air enters the damper 10 through the intake port 11 and is blown out through any one or two of the selected outlets 2, 3, and 19 by the rotation of the damper around the rotating shaft 15.

Specifically, when the damper 10 is at the rotation angle position shown in FIG. 4, the conditioned air, passing through the face outlet 13, face blowout port 2, and face duct 21, is blown out toward the upper half part of the body of passengers in the cabin.

When the damper 10 is turned slightly counterclockwise in FIG. 4, the face outlet 13 is partially closed, and the foot outlet 14 partially matches the foot blowout port 19, so that part of the conditioned air is blown out through the face blowout port 2, and at the same time, the remaining air passes through the foot outlet 14, foot blowout port 19, and foot duct 23 and blown out toward the feet of the passengers in the cabin.

When the damper 10 is further turned counterclockwise, the communication between the face outlet 13 and the face blowout port 2 is terminated, and only the foot outlet 14 matches the foot blowout port 19, so that the conditioned air is blown out only through the foot blowout port 19.

When the damper 10 is further turned in the conterclockwise direction, the foot outlet 14 partially matches the foot blowout port 19, and at the same time, the defrost outlet 12 partially communicates with the defrost blowout port 3, so that part of the conditioned air is blown out through the foot blowout port 19, and at the same time, the remaining air passes through the defrost outlet 12, defrost blowout port 3, an defrost duct 22 and is blown out toward the inside surface of a windshield glass etc.

When the damper 10 is further turned, the communication between the foot outlet 14 and the foot blowout port 19 is broken off terminated, and only the defrost outlet 12 matches the defrost blowout port 3, so that the conditioned air is blown out only through the defrost blowout port 3.

The drain condensing on the surface of the evaporator 4 drops to the bottom surface of the casing 1, and is discharged through a drain port 29 formed at the corner of the bottom surface of the casing 1.

In the above-described conventional apparatus, since the evaporator 4 is installed horizontally, the drain condensing on the surface of the evaporator 4 is difficult to drop, which increases the resistance of air flowing through the evaporator 4, resulting in a decrease in performance.

Also, since the air sucked horizontally into the casing 1 through the suction port 25 is allowed to flow into the evaporator 4 after the direction of air is changed to the upward direction, a large space for changing the direction of air is required below the evaporator 4, which increases the height of the casing 1.

Further, in the above-described conventional apparatus, when the evaporator 4 is replaced, the casing 1 is removed from the vehicle, and then the casing 1 is disassembled to remove the evaporator 4. Therefore, much manpower and time is required.

Still further, in the above-described conventional apparatus, when the vehicle inclines greatly to the right or left, the drain at the bottom of the casing 1 flows back into the blower case through the suction port 25, from which the drain leaks and drops, resulting in the contamination of the surroundings.

OBJECT AND SUMMARY OF THE INVENTION

An object of the present invention is to solve the above problems and to provide a vehicular air conditioner in which a large space is not required below the evaporator, and therefore the height of the casing can be decreased, the evaporator can be pulled out of the casing easily and rapidly, and the drain condensing on the surface of the evaporator is allowed to drop smoothly onto the bottom surface of the casing and can be discharged.

The present invention was made to solve the above problems, and the gist of a first mode of the present invention is that there is provided a vehicular air conditioner, in which an air flow passage for directing air sucked horizontally through a suction port upward in a casing having a plurality of blowout ports at the upper part and said suction port at the lower part, and an evaporator, air mix damper, heater, and blowout mode switching damper for selectively switching the plural blowout ports are arranged in the air flow passage, the vehicular air conditioner being characterized in that the evaporator is disposed at a portion where the direction of air changes from horizontal to upward in the air flow passage so as to be tilted in such a manner that the suction port side end thereof is high and the opposite side end is low, and the casing is divided into a plurality of sections, and also one of the divided casings forms the upper half part of the suction port and is configured as an evaporator detachable cover for covering one side of the evaporator so that the evaporator can be pulled out of the casing by removing the cover.

Another feature of the first mode of the present invention is that a guide for supporting the suction port side end of the evaporator is provided in the evaporator detachable cover.

Still another feature of the first mode of the present invention is that a step portion for supporting the low position side end of the evaporator is provided in the divided casing which forms the bottom portion of the casing and the lower half portion of the suction port.

The present invention was made to solve the above problems, and the gist of a second mode of the present invention is that there is provided a vehicular air conditioner, in which an air flow passage for directing air sucked horizontally through a suction port upward in a casing having a plurality of blowout ports at the upper part and the suction port at the lower part, and an evaporator, air mix damper, heater, and blowout mode switching damper for selectively switching the plural blowout ports are arranged in the air flow passage, the vehicular air conditioner being characterized in that the evaporator is disposed so as to be tilted in such a manner that the suction port side of the evaporator is higher, the bottom surface of the casing is tilted like the evaporator, and a drain discharge port is provided at the lowermost position, and also a drain collecting portion for collecting drain flowing back to the suction side when the vehicle is inclined is provided so as to be depressed from the bottom surface.

Another feature of the second mode of the present invention is that a wind shield plate extending flush with the bottom surface from the suction port side is provided at the entrance of the drain collecting portion.

Still another feature of the second mode of the present invention is that a drain port to which a drain pipe is connected is provided at the drain collecting portion.

DETAILED DESCRIPTION OF PREFERRED EMBODIMENTS

Figure 1:
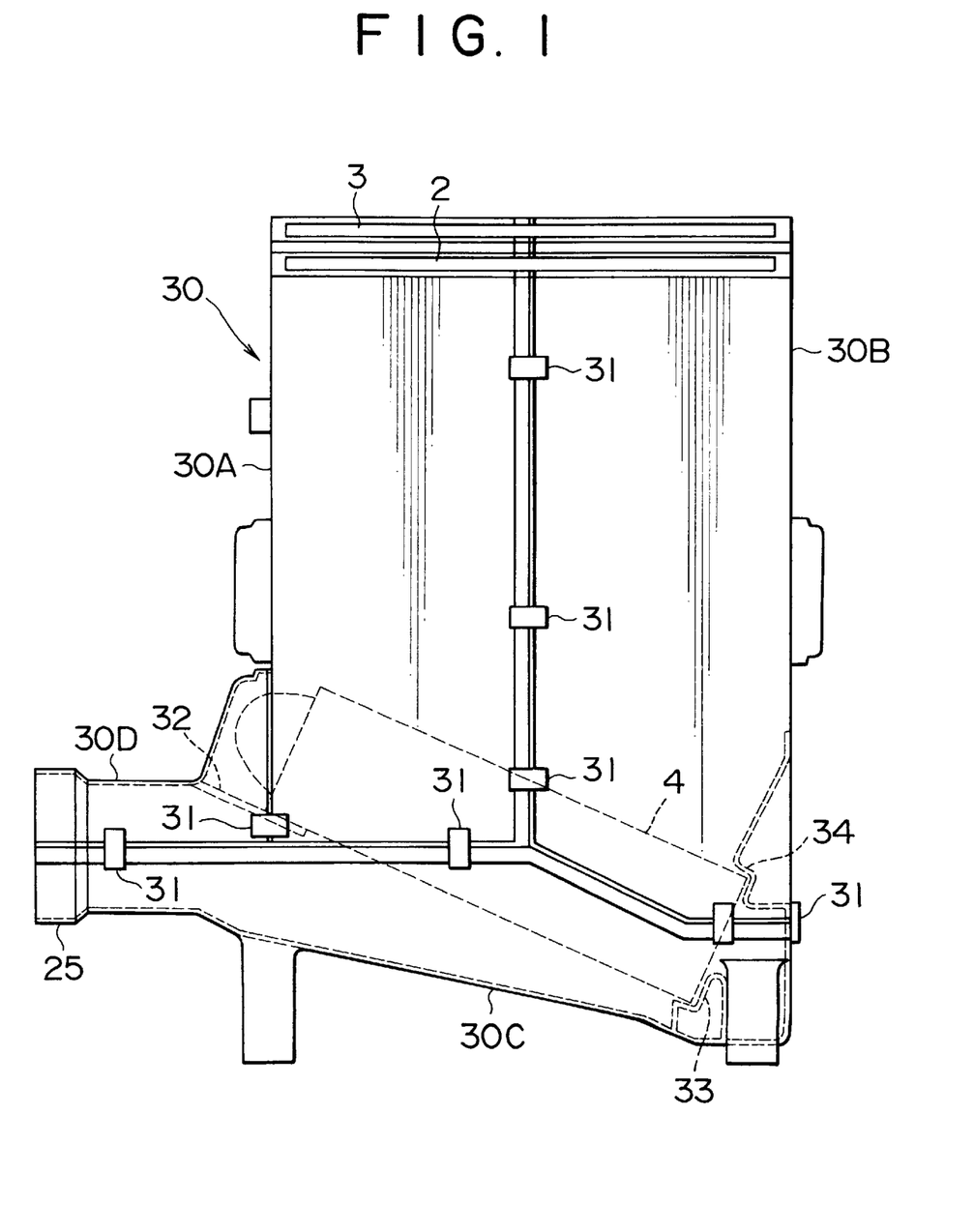
FIG. 1 is a front view showing an embodiment of the present invention.
Figure 2:
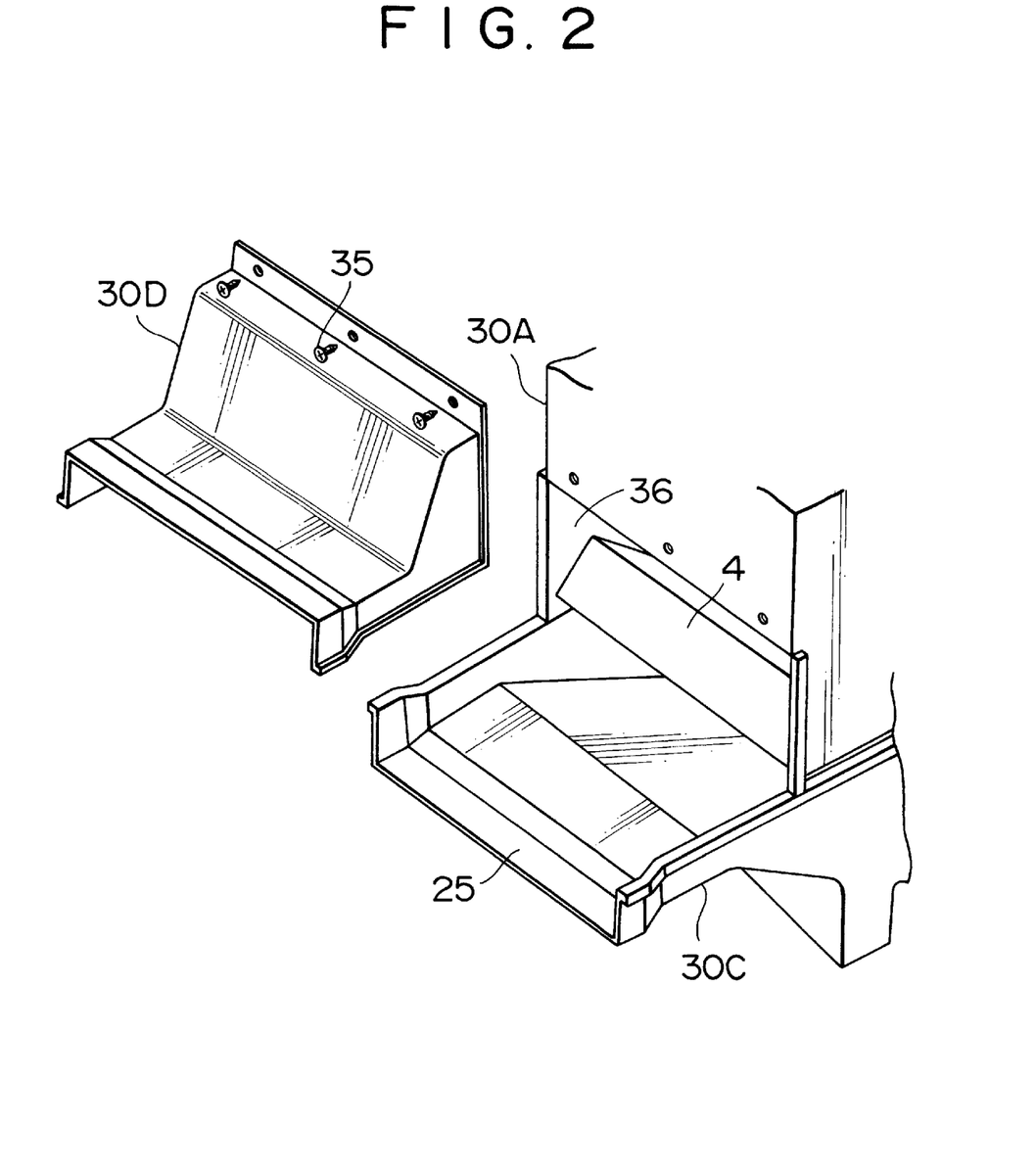
FIG. 2 is a partially broken perspective view of the above embodiment.

A first embodiment of the present invention is shown in FIGS. 1 and 2. FIG. 1 is a front view, and FIG. 2 is a partially broken perspective view. In these figures, the same reference numerals are applied to the same elements as those shown in FIGS. 4 and 5, and the explanation thereof is omitted.

As shown in FIG. 1, an evaporator 4 is disposed at a portion where the direction of air changes from horizontal to upward in an air flow passage formed in a casing 30 to be tilted in such a manner that the suction port side of the evaporator 4 is higher than the suction port 25 and the opposite-side end of the evaporator 4 is lower than the suction port 25.

The casing 30 is divided into a plurality of (four in this figure) sections. The divided casings 30A, 30B, 30C, and 30D are integrated by joining to each other using many clips 31.

The divided casing 30D forms the upper half part of the suction port 25, and at the same time, constitutes an evaporator detachable cover for covering the left side of the evaporator 4. The casing 30D is joined to the divided casings 30A and 30C by clips 31 and screws 35. A guide 32 for supporting the suction port 25 side end of the evaporator 4 is fixed in the cover 30D.

The right-side end of the evaporator 4 abuts on a step portion 34 formed on the divided casing 30B and a step portion 33 formed on the divided casing 30C, and the left-side end is placed on the guide 32, by which the evaporator 4 is maintained in a predetermined position.

The divided casing 30C forms the bottom portion of the casing 30, and also forms the lower half part of the suction port 25.

When replacing the evaporator 4, a refrigerant pipe and sensor connected to the evaporator 4 are first removed, and then the detachable cover 30D is separated and removed from the divided casings 30A and 30B by removing the clips 31 and screws 35 which join the detachable cover 30D to the divided casings 30A and 30C.

Then, the suction port side end of the evaporator 4 disengages the guide 32 and becomes free, so that the evaporator 4 can be slid upward to the left by holding the end thereof, by which the evaporator 4 is pulled out of the casing 30 through an opening 36 formed by the removal of the detachable cover 30D.

A repaired or new evaporator 4 is installed in the casing 30 by reversing the above procedure.

Figure 3:
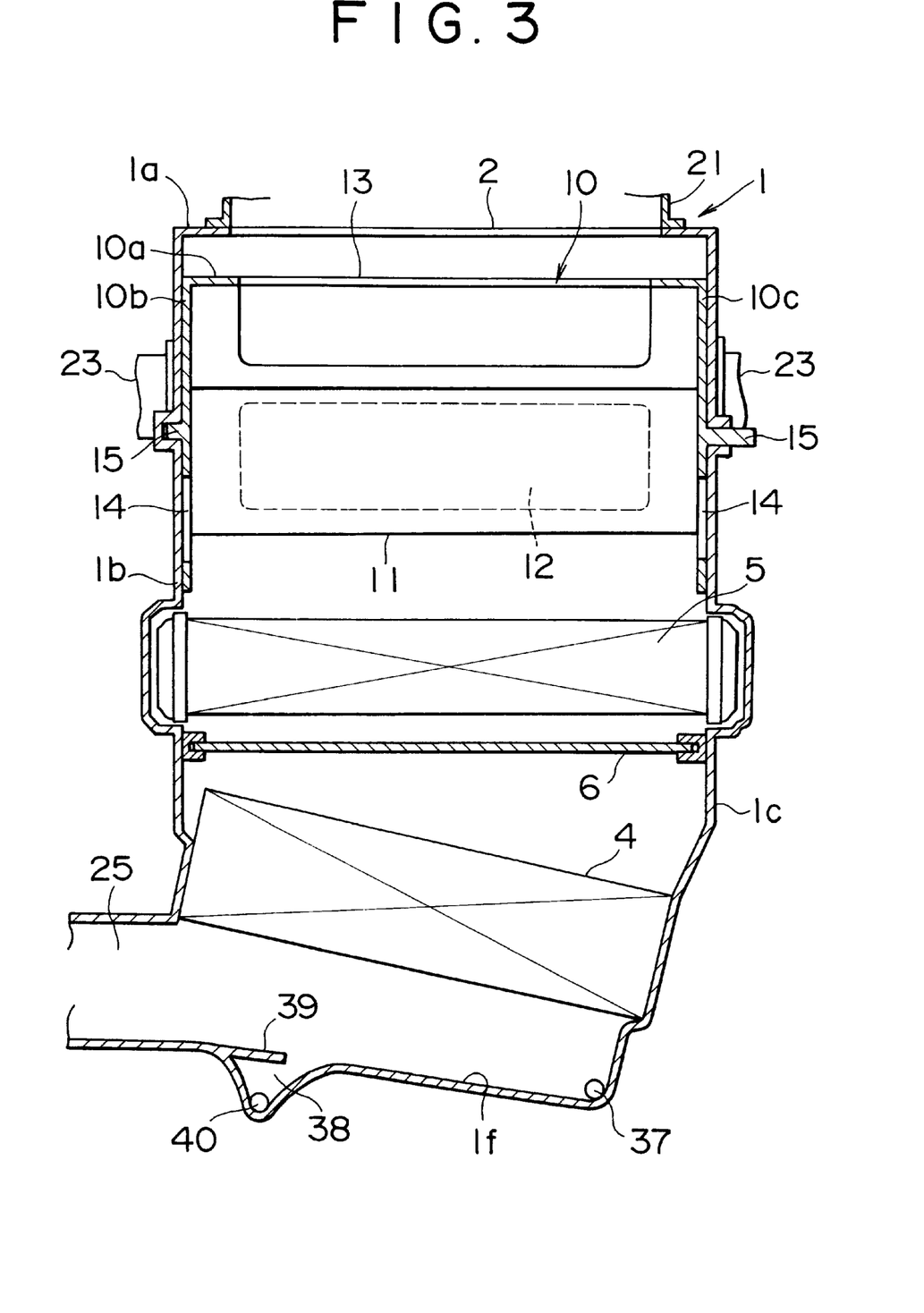
FIG. 3 is a sectional view showing another embodiment of the present invention.

A second embodiment of the present invention is shown in FIG. 3.

An evaporator 4 is disposed at the lower part of a casing 1 to be tilted in such a manner that the suction port 25 side of the evaporator 4 is higher than the opposite side thereof.

A bottom surface 1f of the casing 1 is tilted in such a manner that the suction port 25 side is higher than the opposite side thereof like the evaporator 4. A drain discharge port 37 is provided at the lowermost position, and the bottom surface 1f is depressed to form a drain collecting portion 38.

At the entrance of the drain collecting portion 38, a wind shield plate 39 protrudes from the suction port 25 side such that it extends, by a predetermined length, flush with the bottom surface 1f.

A drain pipe (not shown) is connected to the drain discharge port 37 and a drain port 40 provided at the bottom of the drain collecting portion 38.

Other configuration is the same as that of the conventional air conditioner shown in FIGS. 4 to 6, so that the same reference numerals are applied to the corresponding elements and the explanation thereof is omitted.

In the air conditioner in accordance with the present invention, since the evaporator 4 is tilted, the drain condensing on the surface of the evaporator 4 drops onto the bottom surface 1f of the casing 1 smoothly.

When the vehicle is in a horizontal state, the drain flows down on the bottom surface 1f and is discharged through the drain discharge port 37 and drain pipe.

The air flowing into the lower part of the casing 1 through the suction port 25 flows along the bottom surface 1f by being guided by the wind shield plate 39, so that the air does not flow into the drain collecting portion 38. Therefore, the pressure loss is not increased.

When the vehicle inclines greatly to the right or left, the drain flows back on the bottom surface 1f and enters the drain collecting portion 38, and then is discharged through the drain port 40 and drain pipe.

In the first embodiment, the evaporator is disposed at a portion where the direction of air changes from horizontal to upward in an air flow passage. In other words, the evaporator is tilted in such a manner that the suction port side end thereof is higher than the opposite side end. Further, in the first embodiment, the casing is divided into a plurality of sections. One of the divided casings forms the upper half part of the suction port and is configured as an evaporator detachable cover for covering one side of the evaporator. Therefore, a large space is not required below the evaporator, so that the height of the casing can be decreased. Moreover, the evaporator can be pulled out of the casing easily and rapidly by removing the detachable cover without removing the casing from the vehicle.

If the guide for supporting the suction port side end of the evaporator is provided in the evaporator detachable cover, the suction port side end of the evaporator becomes free when the detachable cover is removed, so that the evaporator can further easily be pulled out.

In the second embodiment, the evaporator is disposed so as to be tilted in such a manner that the suction port side of the evaporator is higher than the other side thereof. Further, the bottom surface of the casing is tilted like the evaporator 4, and the drain discharge port is provided at the lowermost position of the bottom surface. Since the evaporator is disposed so as to be tilted in such a manner that the suction port side end thereof is higher than the suction port and the opposite side end is lower than the suction port a large space is not required below the evaporator, so that the height of the casing can be decreased. Moreover, the drain condensing on the surface of the evaporator drops smoothly onto the bottom surface of the casing, and the drain flows along the bottom surface of the casing and discharged smoothly through the drain discharge port.

Also, since the drain collecting portion in a form of a depression in the bottom surface, for collecting drain flowing back to the suction side of the bottom surface when the vehicle is inclined, is provided, the drain flowing back on the bottom surface, when the vehicle is inclined, is collected by the drain collecting portion. Therefore, the contamination of the surroundings caused by the drain which flows into the blower case and drops from it by leaking can be prevented.

If the wind shield plate extending flush with the bottom surface from the suction port side is provided at the entrance of the drain collecting portion, the increase in the flow resistance of air sucked through the suction port is prevented without inhibiting the collection of drain which flows back.

We claim:

1. A vehicular air conditioner, comprising:
    a casing having blowout ports at an upper portion thereof, a suction port at a lower portion thereof, and an opening provided at one side face thereof between said blowout ports and said suction port;
    an evaporator removably inserted through the opening into said casing; and
    a detachable cover adapted to cover the opening such that said evaporator can be pulled out from said casing, without removing the upper portion of said casing, by removing said cover from said casing, said detachable cover forming a portion of said suction port and having a guide for detachably supporting the suction port side end of said evaporator.

2. A vehicular air conditioner according to claim 1, wherein said evaporator is provided in said casing at an angle such that the suction port side end of said evaporator is higher than said suction port and the opposite side end of the evaporator is lower than the suction port side end.

3. A vehicular air conditioner according to claim 1, wherein said casing includes,
    a heater,
    an air mix damper, and
    a blowout mode switching damper for selectively switching said blowout ports.

4. A vehicular air conditioner according to claim 1, further comprising:
    a step portion provided in a said casing and adapted to detachably support the opposite side end of said evaporator.

5. A vehicular air conditioner according to claim 2, wherein said step portion is provided in a bottom inner surface of said casing.

6. A vehicular air conditioner according to claim 2, wherein said step portion is provided in a vertical inner surface of said casing.

7. A vehicular air conditioner according to claim 1, wherein said detachable cover is attached to said casing by a releasable clip.

8. A vehicular air conditioner according to claim 1, wherein said suction port receives air in a horizontal direction, and said casing directs the received air towards said blowout ports in a vertical direction.

9. A vehicular air conditioner according to claim 1, wherein said evaporator is provided in said housing where the direction of the received air changes from the horizontal direction to the vertical direction.

10. A vehicular air conditioner according to claim 1, wherein said casing is formed of a plurality of divided sections.

11. A vehicular air conditioner, comprising:
    a casing having blowout ports at an upper portion thereof and a suction port at a lower portion thereof, said suction port receiving air in a horizontal direction, said casing directing the received air towards said blowout ports in a vertical direction, and said casing having a bottom inner surface tilted in such a manner that a suction port side thereof is higher than an opposite side thereof;

an evaporator provided in said casing above said bottom inner surface, the suction port side of said evaporator being higher;

a first drain discharge port provided at the lower-most position of said bottom inner surface; and a drain collecting portion provided in said bottom inner surface at a position higher than said first drain discharge port and adapted to collect drain flowing back towards the suction port side when the vehicle is inclined, said drain collecting portion including a depressed portion formed in said bottom inner surface and a second drain discharge port provided in said depressed portion, wherein a wind shield plate extending, flush with said bottom surface, from the suction port side is provided at an entrance of said drain collecting portion.

12. A vehicular air conditioner according to claim 11, wherein a drain pipe is connected to at least one of said first and second drain discharge ports.

13. A vehicular air conditioner according to claim 11, wherein said casing includes, a heater, an air mix damper, and a blowout mode switching damper for selectively switching said blowout ports.

14. A vehicular air conditioner, comprising:

a casing having blowout ports at an upper portion thereof and a suction port at a lower portion thereof, said suction port receiving air in a horizontal direction, said casing directing the received air towards said blowout ports in a vertical direction, and said casing having a bottom inner surface tilted in such a manner that a suction port side thereof is higher than an opposite side thereof;

an evaporator provided in said casing at an angle such that a suction port side of said evaporator is higher than an opposite side thereof;

a drain discharge port provided in said bottom inner surface; and a drain collecting portion provided in said bottom inner surface at a position higher than said drain discharge port and adapted to collect drain flowing back towards the suction port side, said drain collecting portion including a depressed portion formed in said bottom inner surface and a wind shield plate extending, flush with said bottom surface, from the suction port side provided at an entrance of said drain collecting portion.

15. A vehicular air conditioner according to claim 11, wherein said evaporator is provided in said casing at an angle such that the suction port side of said evaporator is higher than the opposite side thereof.

* * * * *

UNITED STATES PATENT AND TRADEMARK OFFICE
CERTIFICATE OF CORRECTION

PATENT NO. : 6,029,739
DATED : February 29, 2000
INVENTOR(S) : T. IZAWA et al.

It is certified that error appears in the above-identified patent and that said Letters Patent is hereby corrected as shown below:

Title page item [30], should read as follows:

[30] Foreign Application Priority Data

Sep.. 6, 1996 [JP] Japan ........................... 8-255382
Oct. 3, 1996 [JP] Japan ........................... 8-281300

Signed and Sealed this

Thirteenth Day of February, 2001

Attest:

NICHOLAS P. GODICI

Attesting Officer    Acting Director of the United States Patent and Trademark Office